(12) United States Patent
Imamura

(10) Patent No.: US 10,807,514 B2
(45) Date of Patent: Oct. 20, 2020

(54) VEHICULAR LAMP

(71) Applicant: STANLEY ELECTRIC CO., LTD., Tokyo (JP)

(72) Inventor: Tomoyuki Imamura, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/365,291

(22) Filed: Mar. 26, 2019

(65) Prior Publication Data
US 2019/0299845 A1  Oct. 3, 2019

(30) Foreign Application Priority Data

Mar. 28, 2018  (JP) ................... 2018-062653

(51) Int. Cl.
*B60Q 1/076* (2006.01)
*B60Q 1/068* (2006.01)
*B60Q 1/08* (2006.01)

(52) U.S. Cl.
CPC .......... *B60Q 1/076* (2013.01); *B60Q 1/0683* (2013.01); *B60Q 1/08* (2013.01)

(58) Field of Classification Search
None
See application file for complete search history.

(56) References Cited

U.S. PATENT DOCUMENTS

| 6,220,735 | B1 | 4/2001 | Matubara | |
| 2003/0117812 | A1* | 6/2003 | Serizawa | B60Q 1/0683 |
| | | | | 362/528 |
| 2008/0089086 | A1* | 4/2008 | Tajima | B60Q 1/10 |
| | | | | 362/524 |
| 2008/0130301 | A1* | 6/2008 | Kusagaya | B60Q 1/0683 |
| | | | | 362/466 |

(Continued)

FOREIGN PATENT DOCUMENTS

EP  2338728 A1  6/2011
JP  2000-57824 A  2/2000

(Continued)

OTHER PUBLICATIONS

The extended European Search Report for the related European Patent Application No. 19165542.2 dated Sep. 13, 2019.

*Primary Examiner* — Britt D Hanley
(74) *Attorney, Agent, or Firm* — Kenealy Vaidya LLP

(57) ABSTRACT

A vehicular lamp capable of stably supporting a light source unit and adjusting an optical axis by an optical axis adjusting mechanism is provided. A holder for a light source unit is supported to be tiltable relative to the bracket, and an optical axis adjustment mechanism has three support points supporting the holder relative to the bracket, and includes a first pivot portion located at a first support point among the support points and supporting the holder so that the holder is tiltable relative to the bracket, a second pivot portion located at a second support point and supporting the holder so that the holder is tiltable relative to the bracket, and an (Continued)

actuator located at a third support point and adjusting a tilt of the holder relative to the bracket vertically. In the front view, the first, second, and third support points are located outside the light source unit.

10 Claims, 11 Drawing Sheets

(56) References Cited

U.S. PATENT DOCUMENTS

| | | |
|---|---|---|
| 2008/0225543 A1* | 9/2008 | Kuwahara ............ B60Q 1/0683 362/523 |
| 2009/0207626 A1 | 8/2009 | Kim |
| 2013/0121013 A1 | 5/2013 | Shibata et al. |

FOREIGN PATENT DOCUMENTS

| | | |
|---|---|---|
| JP | 6176931 B2 | 8/2017 |
| WO | 2016/201466 A1 | 12/2016 |

\* cited by examiner

VEHICULAR LAMP

This application claims the priority benefit under 35 U.S.C. § 119 of Japanese Patent Application No. 2018-062653 filed on Mar. 28, 2018, which is hereby incorporated in its entirety by reference.

TECHNICAL FIELD

The presently disclosed subject matter relates to a vehicular lamp.

BACKGROUND ART

Conventionally, in a vehicular lamp such as a vehicular headlamp, a light source unit configured to project light toward the front of a vehicle is disposed inside a lamp body constituted by a housing having an opening at its front surface and a lens cover covering the opening of the housing, and an optical axis adjusting mechanism configured to adjust an optical axis of light projected from the light source unit toward the front of the vehicle is provided. Examples of such a vehicular lamp may include those disclosed in Japanese Patent Application Laid-Open No. 2000-057824 (or U.S. Pat. No. 6,220,735 corresponding thereto).

In the vehicular lamp provided with such an optical axis adjusting mechanism, the optical axis of light projected from the light source unit toward the front of the vehicle can be adjusted when the vehicle is in a stopped state (horizontal state of the vehicle) by manually adjusting the vertical (up-down direction) tilt and the horizontal (left-right) tilt of the light source unit as an aiming operation.

On the other hand, when the vehicle is traveling (i.e., when the vehicle is inclined), after the tilt in the front-rear direction of the vehicle is detected, performing a leveling operation in which the optical axis of the light projected from the light source unit toward the front of the vehicle is automatically adjusted in the vertical direction can achieve correction of the variation of the optical axis due to the change in the attitude of the traveling vehicle.

Further, in the vehicular headlamp disclosed in Japanese Patent Application Laid-Open No. 2000-057824, an intermediate tilting member is supported so as to be tiltable with respect to a lamp body and a reflector is supported so as to be tiltable with respect to the intermediate tilting member. Among three support points that support the intermediate tilting member with respect to the lamp body, one support point serves as a tilting fulcrum, and the other two support points are supported via an aiming adjustment member which changes the position of the intermediate tilting member relative to the lamp body. Among three support points that support the reflector with respect to the intermediate tilting member, two support points serve as a tilting support point, and the other support point is supported via a leveling actuator that automatically or remotely changes the position of the reflector with respect to the intermediate tilting member.

In the vehicular headlamp described in Japanese Patent Application Laid-Open No. 2000-057824, the aiming adjustment mechanism and the leveling adjustment mechanism are independently provided, and the leveling actuator can be disposed inside the lamp body.

Incidentally, the vehicular headlamp described in Japanese Patent Application Laid-Open No. 2000-057824 is configured such that the reflector is supported so as to be tiltable with respect to the intermediate tilting member, and that the leveling adjustment mechanism is disposed between the intermediate tilting member and the reflector.

In this configuration, spherical concave portions serving as three support points are provided on the back surface side of the reflector as the leveling adjustment mechanism, and spherical portions on the intermediate tilting member side are fitted into these spherical concave portions, thereby supporting the back surface side of the reflector so that the reflector is tiltable.

However, the leveling adjustment mechanism described in Japanese Patent Application Laid-Open No. 2000-057824 must be configured such that the spherical concave portions are integrally provided on the back side of the reflector, and thus the forming process of the reflector becomes complicated. In addition, the reflector has a reflection surface shape designed for the light source bulb. However, when the reflector is molded, a sink is generated in portions in which the spherical concave portions are provided, so that the shape of the reflection surface may deviate from the intended design range. In addition, sufficient space must be ensured for the leveling adjustment mechanism to be disposed between the intermediate tilting member and the reflector. If such a space is insufficient, the support position of the reflector may be limited to an unstable position, or the adjustment range of the optical axis may be restricted.

SUMMARY

The presently disclosed subject matter was devised in view of these and other problems and features in association with the conventional art. According to an aspect of the presently disclosed subject matter, there can be provided a vehicular lamp capable of supporting a light source unit in a stable state and stably adjusting an optical axis by an optical axis adjusting mechanism.

According to another aspect of the presently disclosed subject matter, a vehicular lamp can include: a housing having an opening at its front surface; a lens cover configured to cover the opening of the housing to form a lamp body together with the housing; a light source unit configured to project light toward a front of a vehicle, the light source unit being disposed inside the lamp body; and an optical axis adjustment mechanism configured to adjust an optical axis of light projected from the light source unit toward the front of the vehicle, wherein the vehicular lamp further includes a holder configured to hold the light source unit and to be attached to the front surface of the housing via a bracket, the holder being supported so as to be tiltable with respect to the bracket, the optical axis adjusting mechanism includes: three support points configured to support the holder with respect to the bracket; and a first pivot portion located at a first support point among the three support points and supporting the holder so that the holder is tiltable with respect to the bracket; a second pivot portion located at a second support point among the three support points and supporting the holder so that the holder is tiltable with respect to the bracket; and an actuator located at a third support point among the three support points, the actuator being configured to adjust a tilt of the holder with respect to the bracket in a vertical direction, and the first support point, the second support point, and the third support point are located outside the light source unit when the light source unit is viewed in a front view.

In the vehicular lamp according to the aforementioned aspect, when the light source unit is view in the front view, a support line assumed to connect the first support point and the second support point may be parallel to a first horizontal line assumed to pass through an optical axis center of the light source unit, and a first vertical line assumed to pass through the optical axis center of the light source unit may be orthogonal to the support line in the middle of the support line.

In the vehicular lamp according to the aforementioned aspect, when the light source unit is viewed in the front view, the support line and the third support point may be located on respective sides opposite to each other across the first horizontal line, and the optical axis center of the light source unit may be located inside an area defined by connecting the first support point, the second support point, and the third support point.

Alternatively, in the vehicular lamp according to the aforementioned aspect, when the light source unit is viewed in the front view, the support line and the first horizontal line may coincide with each other.

In the preceding case, when the light source unit is viewed in a side view, a center of rotation of the light source unit may coincide with the center of gravity of the light source unit.

Alternatively, when the light source unit is viewed in the side view, the center of rotation of the light source unit may be located forward of the center of gravity of the light source unit.

In the vehicular lamp according to any of the foregoing aspects, when the light source unit is viewed in the front view, the third support point may be located on the first vertical line.

In the vehicular lamp according to any of the foregoing aspects, when the light source unit is viewed in the front view, the third support point may be located on one side with respect to the first vertical line.

The vehicular lamp according to any of the foregoing aspects may have a structure in which the bracket may be supported so as to be tiltable with respect to the housing, the optical axis adjusting mechanism may include: three support points configured to support the bracket with respect to the housing; and a third pivot portion located at a fourth support point among the three support points and supporting the bracket so that the bracket is tiltable with respect to the housing, a left-right tilt adjusting tool located at a fifth support point among the three support points and being configured to adjust a tilt of the bracket with respect to the housing in the left-right direction, and a vertical tilt adjusting tool located at a sixth support point among the three support points and being configured to adjust the tilt of the bracket with respect to the housing in the vertical direction, and the fourth support point, the fifth support point, and the sixth support point may be located outside the light source unit when the light source unit is viewed in the front view.

In the vehicular lamp according to any of the foregoing aspects, when the light source unit is viewed in the front view, the fifth support point may be located on a second horizontal line assumed to pass through the fourth support point, and the sixth support point may be located on a second vertical line assumed to pass through the fourth support point.

As described above, according to the presently disclosed subject matter, it is possible to provide a vehicular lamp capable of supporting the light source unit in a stable state and also stably adjust the optical axis by the optical axis adjustment mechanism.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

Figure 1:
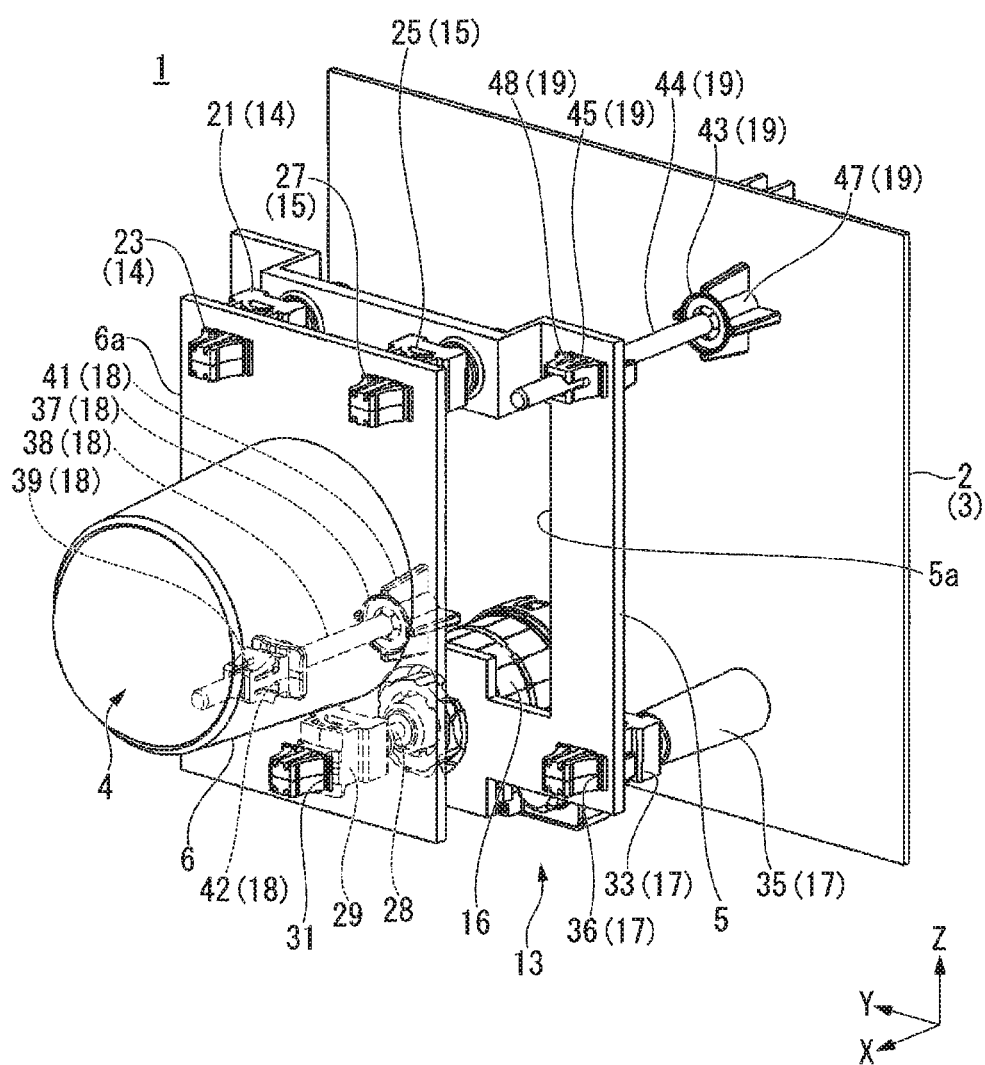
FIG. 1 is a perspective view showing a configuration of a vehicular lamp according to an exemplary embodiment of the presently disclosed subject matter.

A description will now be made below to vehicular lamps of the presently disclosed subject matter with reference to the accompanying drawings in accordance with exemplary embodiments.

In the drawings used in the following description, in order to make each component easy to be observed, the scale of the dimension may be shown differently depending on the component, and the dimensional ratio of each component is not necessarily the same as the actual ratio.

As an embodiment of the present invention, for example, a vehicular lamp 1 shown in FIGS. 1 to 4 will be described.

FIG. 1 is a perspective view showing a configuration of the vehicular lamp 1.

Figure 2:
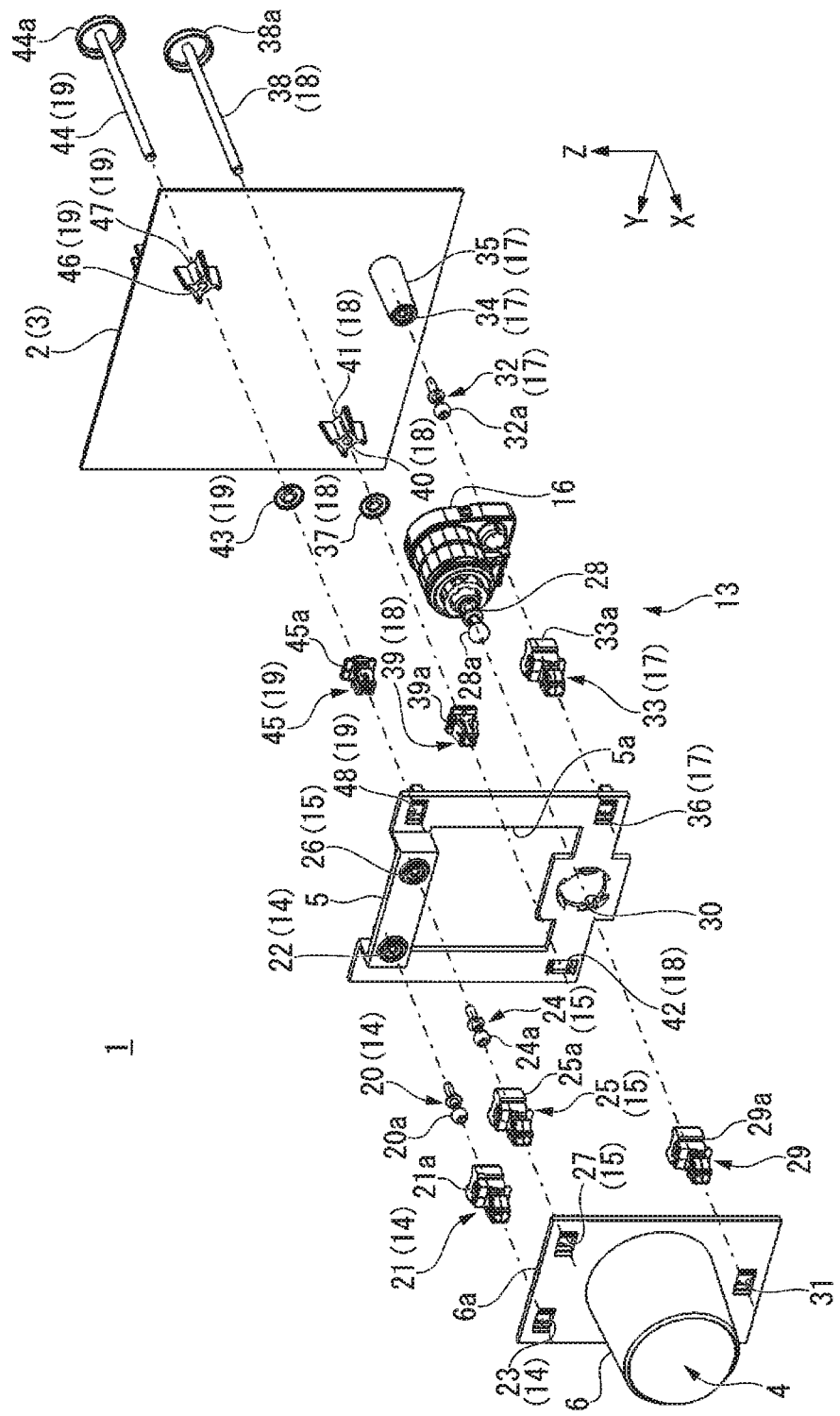
FIG. 2 is an exploded perspective view showing the configuration of the vehicular lamp shown in FIG. 1.
Figure 3:
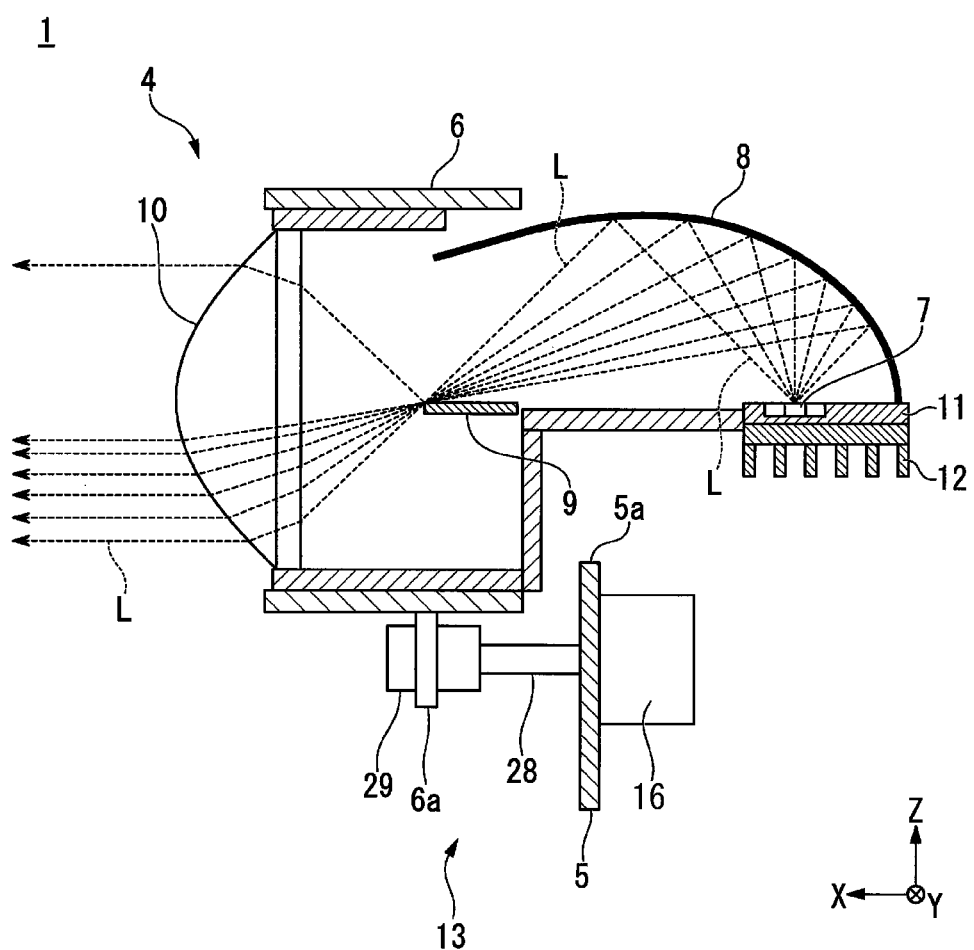
FIG. 3 is a side view showing a configuration of a light source unit included in the vehicular lamp shown in FIG. 1.
Figure 4:
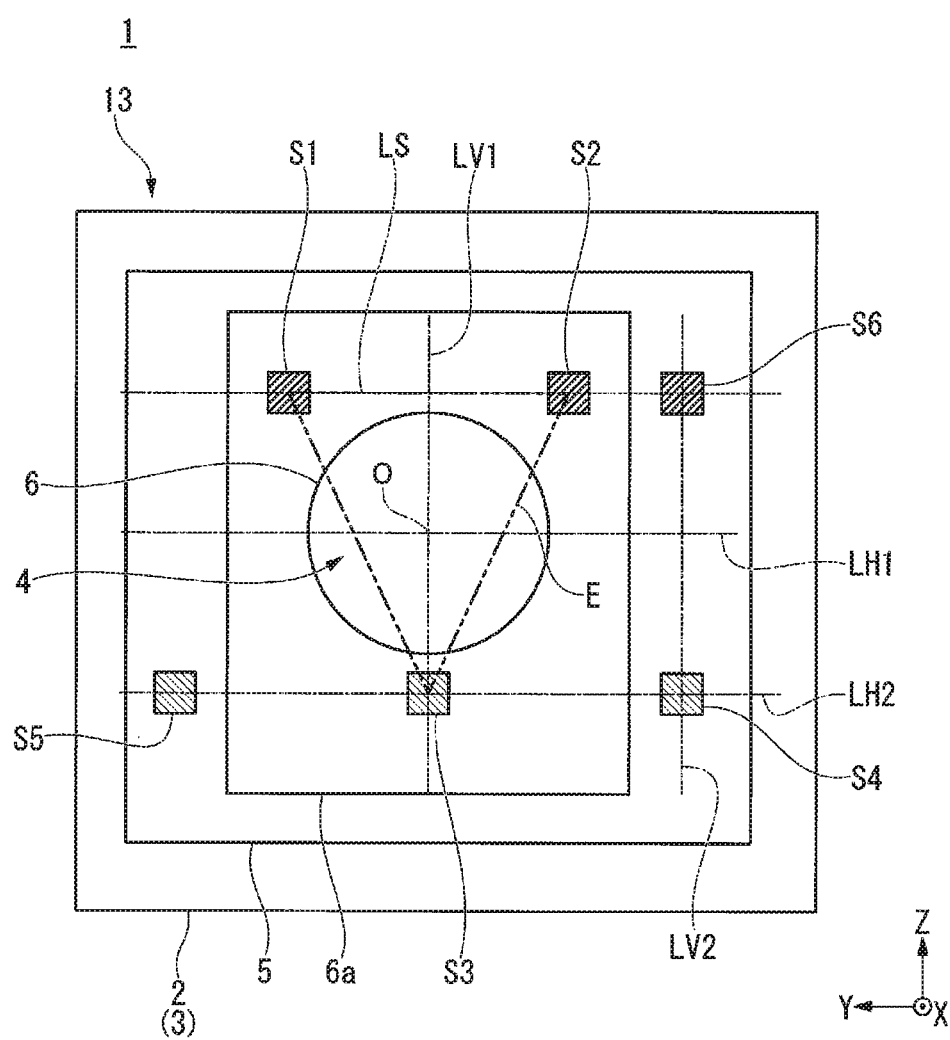
FIG. 4 is a schematic view showing the arrangement of support points when the light source unit provided in the vehicular lamp shown in FIG. 1 is view in the front view.

FIG. 2 is an exploded perspective view showing the configuration of the vehicular lamp 1. FIG. 3 is a side view showing the configuration of the light source unit 4 provided in the vehicular lamp 1. FIG. 4 is a schematic diagram showing the arrangement of support points S1 to S6 when the light source unit 4 provided in the vehicular lamp 1 is view in the front view.

In the drawings shown below, the XYZ orthogonal coordinate system is set, and the X-axis direction is indicated as the front-rear direction (length or depth direction) of the vehicular lamp 1, the Y-axis direction is indicated as the left-right direction (width direction) of the vehicular lamp 1, and the Z-axis direction is indicated as the vertical direction (height direction) of the vehicular lamp 1.

In the vehicular lamp 1 of the present exemplary embodiment, for example, the presently disclosed subject matter is applied to a vehicular headlamp mounted on both corner portions of a vehicle (not illustrated) on the front end side thereof.

Specifically, as shown in FIGS. 1 and 2, the vehicular lamp 1 has a structure in which a light source unit 4 configured to projecting light toward the front of the vehicle, i.e., in the +X-axis direction, is disposed inside a lamp body 3 composed of a housing 2 and a transparent lens cover (not illustrated). The housing 2 has an opening at its front surface, and the transparent lens cover covers the opening of the housing 2.

The vehicular lamp 1 has a structure in which a holder 6 configured to hold the light source unit 4 is attached to the front surface of the housing 2 via a bracket 5, the holder 6 is supported so as to be tiltable with respect to the bracket 5, and the bracket 5 is supported so as to be tiltable with respect to the housing 2. An opening 5a through which the light source unit 4 penetrates is provided in a substantially central portion of the bracket 5.

As shown in FIGS. 1, 2, and 3, the light source unit 4 having an optical axis center O includes: a light source 7 composed of, for example, a chip LED (SMD LED) that emits white light (hereinafter simply referred to as light) L; a reflector 8 configured to reflect the light L emitted upward from the light source 7 toward the front of the vehicle; a shade 9 configured to shield (cut) a portion of the light L reflected by the reflector 8; a projection lens 10 configured to project the light L partially cut by the shade 9 toward the front of the vehicle; a substrate 11 on which the light source 7 is mounted on one surface (in the present exemplary embodiment, the upper surface); and a heat sink 12 configured to radiate heat emitted by the light source 7 while being in contact with the other surface (in the present exemplary embodiment, the lower surface) of the substrate 11.

In the light source unit 4, a light source image defined by the front end of the shade 9 is reversed and projected as a passing beam (low beam) by the projection lens 10, thereby forming a low beam light distribution pattern including a cut-off line at the upper end thereof.

The light source unit 4 may have a configuration in which a cooling fan (not illustrated) is attached to the back surface side of the light source unit 4. As the light source 7, for example, a light emitting element such as a laser diode (LD) may be mentioned as an example in addition to the above-described LED. The number of light-emitting elements is not limited to one, and may be two or more.

The light source unit 4 may be configured to form a high-beam light distribution pattern above the low-beam light distribution pattern by disposing a second light source (not illustrated) below the shade 9, and projecting light emitted from the second light source as a traveling beam by the projection lens 10 toward the vehicle traveling direction.

The light source unit 4 is integrally held in the holder 6 by accommodating the light source 7, the reflector 8, the shade 9, the projection lens 10, the substrate 11, and the heat sink 12, which are described above, inside the holder 6 which is in a substantially cylindrical shape. A flat plate-shaped flange portion 6a is provided on the outer peripheral portion of the base end of the holder 6 so as to project radially.

The light source unit 4 is not necessarily limited to a projector-type light source unit that projects the light L toward the front of the vehicle using the above-described projection lens 10, and may be, for example, a reflector-type light source unit that projects the light L toward the front of the vehicle using a reflector including a plurality of reflection surfaces while eliminating a projection lens, or a light guide lens-type light source unit that projects the light L toward the front of the vehicle using a light guide lens.

As shown in FIGS. 1 and 2, the vehicular lamp 1 of the present exemplary embodiment includes an optical axis adjusting mechanism 13 configured to adjust the optical axis of light projected from the light source unit 4 toward the front of the vehicle.

The optical axis adjustment mechanism 13 has three support points S, S2, and S3 which support the holder 6 with respect to the bracket 5, and includes, as a leveling adjustment mechanism, a first pivot portion 14 which is located at the first support point S1 among the three support points S1, S2, and S3 and configured to support the holder 6 so that the holder 6 is tiltable with respect to the bracket 5, a second pivot portion 15 which is located at the second support point S2 among the three support points S1, S2, and S3 and configured to support the holder 6 so that the holder 6 is tiltable with respect to the bracket 5, and an actuator 16 which is located at the third support point S3 among the three support points S1, S2, and S3 and configured to adjust the tilt of the holder 6 with respect to the bracket 5 in the vertical direction.

The optical axis adjustment mechanism 13 has three support points S4, S5, and S6 which support the bracket 5 with respect to the housing 2, and includes, as an aiming adjustment mechanism, a third pivot portion 17 which is located at a fourth support point S4 among the three support points S4, S5, and S6 and configured to support the bracket 5 so that the bracket 5 is tiltable with respect to the housing 2, a left-right tilt adjustment tool 18 which is located at a fifth support point S5 among the three support points S4, S5, and S6 and configured to adjust the tilt of the bracket 5 with respect to the housing 2 in the left-right direction, and a vertical tilt adjustment tool 19 which is located at a sixth support point S6 among the three support points S4, S5, and S6 and configured to adjust the tilt of the bracket 5 with respect to the housing 2 in the vertical direction.

In the optical axis adjusting mechanism 13, as shown in FIG. 4, when the light source unit 4 is view in the front view, the first support point S1, the second support point S2, and the third support point S3 are located outside the light source unit 4.

Herein, a support line LS is assumed to connect the first support point S1 and the second support point S2 among these support points, and a first horizontal line LH1 is assumed to pass through the optical axis center O of the light source unit 4. In the present exemplary embodiment, the support line LS is set to be parallel to the first horizontal line LH1. Furthermore, a first vertical line LV1 is assumed to pass through the optical axis center O of the light source unit 4. In the present exemplary embodiment, the first vertical line LV1 is set to be orthogonal to the middle of the support line LS.

In addition, the support line LS and the third support point S3 are set to be located on sides opposite to each other with the first horizontal line LH1 interposed therebetween, and the optical axis center O of the light source unit 4 is set to be located inside the area E defined by connecting the first support point S1, the second support point S2, and the third support point S3.

In particular, in the present exemplary embodiment, the support line LS (connecting the first support point S1 and the second support point S2) and the third support point S3 are positioned above and below the first horizontal line LH, respectively, with the first horizontal line LH1 interposed therebetween. Furthermore, the third support point S3 is located on the first vertical line LV1. Further, the optical axis center O of the light source unit 4 is located substantially at the center of the area E.

The optical axis adjusting mechanism 13 is not necessarily limited to the arrangement of the support points S1, S2, and S3 described above, and, for example, the optical axis adjusting mechanism 13 may be configured such that the support line LS (connecting the first support point S1 and the second support point S2) and the third support point S3 are located below and above the first horizontal line LH1, respectively, with the first horizontal line LH1 interposed therebetween.

In the optical axis adjusting mechanism 13, when the light source unit 4 is viewed in the front view, the fourth support point S4, the fifth support point S5, and the sixth support point S6 are located outside the light source unit 4. Herein, a second horizontal line LH2 is assumed to pass through the fourth support point S4, and a second vertical line LV2 is assumed to pass through the fourth support point S4. In the present exemplary embodiment, the fifth support point S5 is set to be located on the second horizontal line LH2, and the sixth support point S6 is set to be located on the second vertical line LV2.

In particular, in the present exemplary embodiment, the fourth supporting point S4, the fifth supporting point S5, and the sixth supporting point S6 are located outside the area E defined by connecting the first supporting point S1, the second supporting point S2, and the third supporting point S3. The fourth support point S4 is located on the extension line of the support line LS, and the third support point S3 is located at the middle of the line connecting the fourth support point S4 and the fifth support point S5, i.e., the second horizontal line LH2.

In the optical axis adjusting mechanism 13 of the present exemplary embodiment, the fourth support point S4 is disposed in the "lower right" portion in FIG. 4, the fifth support point S5 in the "lower left" portion in FIG. 4, and the sixth support point S6 in the "upper right" portion in FIG. 4, with the light source unit interposed therebetween. However, it is no limitative, and the fourth support point S4 may be positioned in any of the "lower right", "lower left", "upper right", or "upper left" portion with the light source unit interposed between it and the others. In this case, the fifth support point S5 needs to be disposed on the opposite side of the fourth support point S4 in the left-right direction with the light source unit 4 interposed therebetween in accordance with the disposition of the fourth support point S4, and the sixth support point S6 need to be disposed on the opposite side of the fourth support point S4 in the vertical direction with the light source unit 4 interposed therebetween in accordance with the disposition of the fourth support point S4.

The first pivot portion 14 includes a first pivot shaft 20 having a spherical convex portion 20a at its tip end and attached to the bracket 5, and a first pivot bearing 21 having a spherical concave portion 21a, into which the spherical convex portion 20a is fitted, and attached to the flange portion 6a of the holder 6.

Correspondingly, a first shaft hole 22 for pivotally supporting the first pivot shaft 20 is provided at a position corresponding to the first support point S1 of the bracket 5. On the other hand, a first mount hole 23 into which the first pivot bearing 21 is fitted is provided at a position corresponding to the first support point S1 of the flange portion 6a (the holder 6).

The second pivot portion 15 includes a second pivot shaft 24 having a spherical convex portion 24a at its tip end and attached to the bracket 5, and a second pivot bearing 25 having a spherical concave portion 25a, into which the spherical convex portion 24a is fitted, and attached to the flange portion 6a of the holder 6.

Correspondingly, a second shaft hole 26 for pivotally supporting the second pivot shaft 24 is provided at a position corresponding to the second support point S2 of the bracket 5. On the other hand, a second mount hole 27 into which the second pivot bearing 25 is fitted is provided at a position corresponding to the second support point S2 of the flange portion 6a (the holder 6).

The actuator 16 slidably drives in the front-rear direction a slide shaft 28 provided with a spherical convex portion 28a at the distal end. On the other hand, a third pivot bearing 29 having a spherical concave portion 29a into which the spherical convex portion 28a is fitted is attached to the flange portion 6a of the holder 6.

Correspondingly, a fixing hole 30 for fixing the actuator 16 is provided at a position corresponding to the third support point S3 of the bracket 5. On the other hand, a third mount hole 31 into which the third pivot bearing 29 is fitted is provided at a position corresponding to the third support point S3 of the flange portion 6a (holder 6).

The third pivot portion 17 has a third pivot shaft 32 having a spherical convex portion 32a at its tip end and attached to the housing 2, and a fourth pivot bearing 33 having a spherical concave portion 33a, in which the spherical convex portion 32a is fitted, and attached to the bracket 5.

Correspondingly, a third shaft hole 34 for pivotally supporting the third pivot shaft 32 is provided at a position corresponding to the fourth support point S4 of the housing 2. The third axial hole 34 is provided in a first boss 35 protruding from the front surface of the housing 2. On the other hand, a fourth mount hole 36 into which the fourth pivot bearing 33 is fitted is provided at a position corresponding to the fourth support point S4 of the bracket 5.

The right/left tilt adjusting tool 18 has a first adjusting bolt 38 attached to the housing 2 via a first speed nut 37, and a first adjusting nut 39 attached to the bracket 5 in a state of being fastened to the first adjusting bolt 38.

Correspondingly, at a position corresponding to the fifth support point S5 of the housing 2, a first through hole 40 through which the first adjusting bolt 38 passes is provided. The first through hole 40 is provided in a second boss 41 protruding from the front surface of the housing 2. The first speed nut 37 is screwed to the first adjusting bolt 38 in a state of abutting the tip end of the second boss 41. The head portion of the first adjustment bolt 38 constitutes a left-right adjustment dial 38a for rotating the first adjustment bolt 38 on the rear surface side of the housing 2. On the other hand, a fifth mount hole 42 into which the first adjustment nut 39 is fitted is provided at a position corresponding to the fifth support point S5 of the bracket 5.

The vertical tilt adjusting tool 19 has a second adjusting bolt 44 attached to the housing 2 via a second speed nut 43, and a second adjusting nut 45 attached to the bracket 5 in a state of being fastened to the second adjusting bolt 44.

Correspondingly, a second through hole 46 through which the second adjusting bolt 44 passes is provided at a position corresponding to the sixth support point S6 of the housing 2. The second through hole 46 is provided in a third boss 47 protruding from the front surface of the housing 2. The second speed nut 43 is screwed to the second adjusting bolt 44 in a state of abutting the tip end of the third boss 47. The head portion of the second adjustment bolt 44 constitutes a vertical adjustment dial 44a for rotating the second adjustment bolt 44 on the rear surface side of the housing 2. On the other hand, a sixth mount hole 48 into which the second adjustment nut 45 is fitted is provided at a position corresponding to the sixth support point S6 of the bracket 5.

In the optical axis adjusting mechanism 13 of the present exemplary embodiment, it is possible to perform an aiming operation for manually adjusting the tilt of the light source unit 4 in the left-right direction by operating the left-right tilt adjusting tool 18. Specifically, the first adjustment nut 39 fastened to the first adjustment bolt 38 slides in the front-rear direction by rotating the left-right adjustment dial 38a. At this time, the bracket 5 swings in the left-right direction with respect to the housing 2 with the third pivot portion 17 as a fulcrum. This makes it possible to adjust the tilt of the light source unit 4 in the left-right direction.

On the other hand, in the optical axis adjusting mechanism 13, it is possible to perform an aiming operation for manually adjusting the tilt of the light source unit in the vertical direction 4 by operating the vertical tilt adjusting tool 19. Specifically, the second adjustment nut 45 fastened to the second adjustment bolt 44 slides in the front-rear direction by rotating the vertical adjustment dial 44a. At this time, the bracket 5 swings in the vertical direction with respect to the housing 2 with the third pivot portion 17 as a fulcrum. As a result, it is possible to adjust the tilt of the light source unit 4 in the vertical direction.

Figure 5:
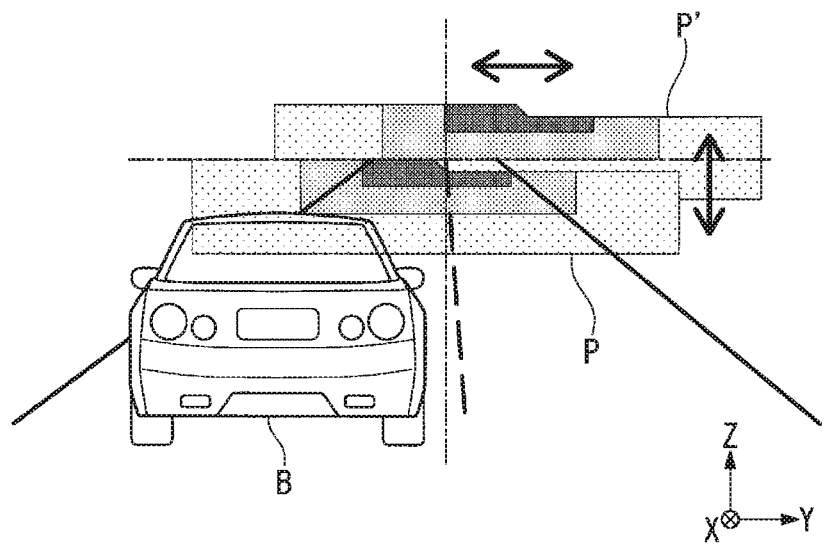
FIG. 5 is a schematic view for explaining an aiming operation by an optical axis adjusting mechanism provided in the vehicular lamp shown in FIG. 1.
Figure 6:
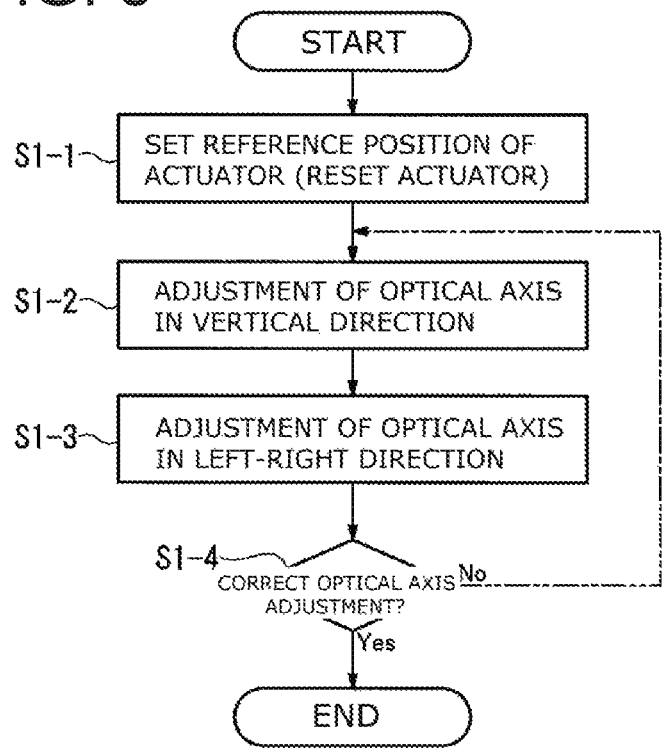
FIG. 6 is a flowchart for explaining an aiming operation by an optical axis adjusting mechanism provided in the vehicular lamp shown in FIG. 1.

Here, the aiming operation by the optical axis adjusting mechanism 13 will be described with reference to FIGS. 5 and 6. FIG. 5 is a schematic diagram for explaining an aiming operation by the optical axis adjusting mechanism 13. FIG. 6 is a flowchart for explaining the aiming operation by the optical axis adjusting mechanism 13.

FIG. 5 shows the low beam light distribution pattern P' before the aiming adjustment and the low beam light distribution pattern P after the aiming adjustment both projected toward the front of the vehicle B. The intersection of the horizontal axis and the vertical axis shown in FIG. 5 represents the angle reference position (0°) in front of the vehicle B.

In the aiming operation by the optical axis adjusting mechanism 13 of the present exemplary embodiment, first, as shown in the step S1-1 in FIG. 6, the reference position of the actuator 16 is set. That is, the actuator 16 is reset to confirm that the slide shaft 28 of the actuator 16 is located in the initial position.

Next, as shown in step S1-2 in FIG. 6, the vertical tilt of the light source unit 4 is manually adjusted by rotating the vertical adjusting dial 44a. As a result, as shown in FIG. 5, the low-beam light distribution pattern P' projected toward the front of the vehicle B is adjusted so that the position thereof in the vertical direction becomes the low-beam light distribution pattern P which matches the safety standard.

Next, as shown in step S1-3 in FIG. 6, the tilt of the light source unit 4 in the left-right direction is manually adjusted by rotating the left-right adjusting dial 38a. As a result, as shown in FIG. 5, the low-beam light distribution pattern P' projected toward the front of the vehicle B is adjusted so that the position in the left-right direction becomes the low-beam light distribution pattern P which matches the security standard.

Next, as shown in step S1-4 in FIG. 6, it is confirmed whether or not the positions of the low beam light distribution pattern P in the vertical direction and the left-right direction match the security standard. Then, the operations of step S1-2 and step S1-3 are repeated until the positions of the low beam light distribution pattern P in the vertical direction and the left-right direction match the safety standard. The steps S1-2 and S1-3 may be reversed.

In the vehicular lamp 1 of the present exemplary embodiment, it is possible to adjust the optical axis of the light projected from the light source unit 4 toward the front of the vehicle B when the vehicle is in a stopped state, i.e., when the vehicle is horizontal, by the above-described aiming operation using the optical axis adjustment mechanism 13.

On the other hand, in the optical axis adjusting mechanism 13 of the present exemplary embodiment, it is possible to perform a leveling operation for automatically adjusting the vertical tilt of the light source unit 4. Specifically, when the actuator 16 slidably drives the slide shaft 28 in the front-rear direction, the holder 6 swings in the vertical direction with respect to the bracket 5 with the first pivot portion 14 and the second pivot portion 15 as a fulcrum. This makes it possible to automatically adjust the vertical tilt of the light source unit 4.

Figure 7:
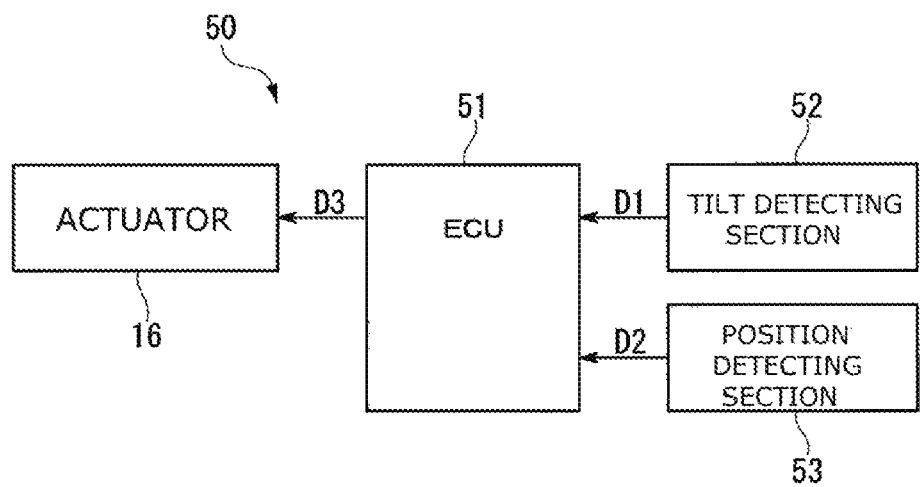
FIG. 7 is a block diagram showing a configuration of a controller for controlling the optical axis adjusting mechanism provided in the vehicular lamp shown in FIG. 1.
Figure 8:
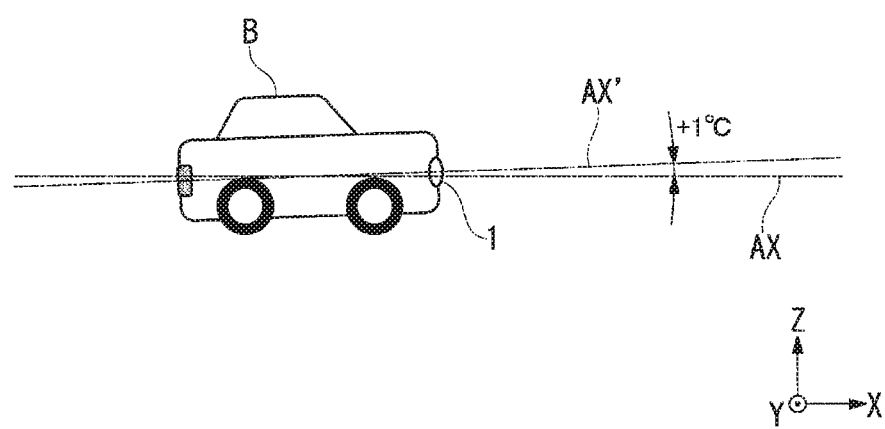
FIG. 8 is a schematic view showing a change in the attitude of a vehicle provided with the vehicular lamp shown in FIG. 1.
Figure 9:
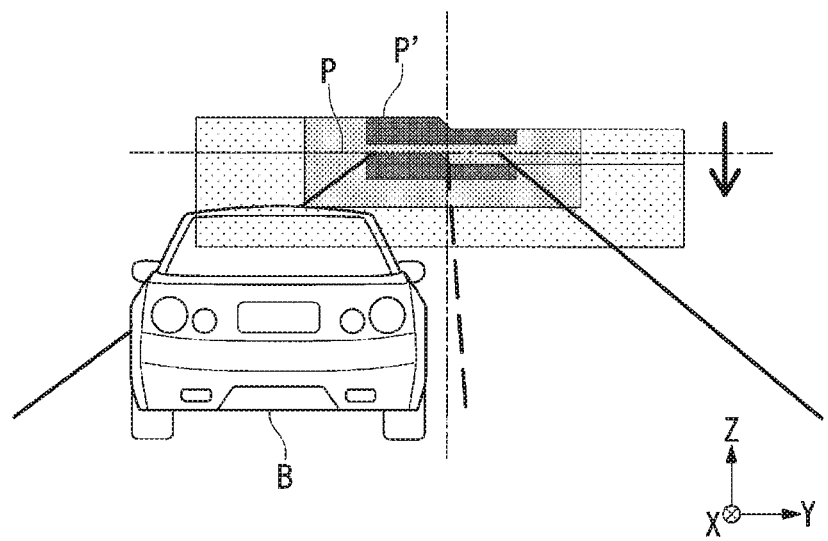
FIG. 9 is a schematic view for explaining a leveling operation by the optical axis adjusting mechanism provided in the vehicular lamp shown in FIG. 1.
Figure 10:
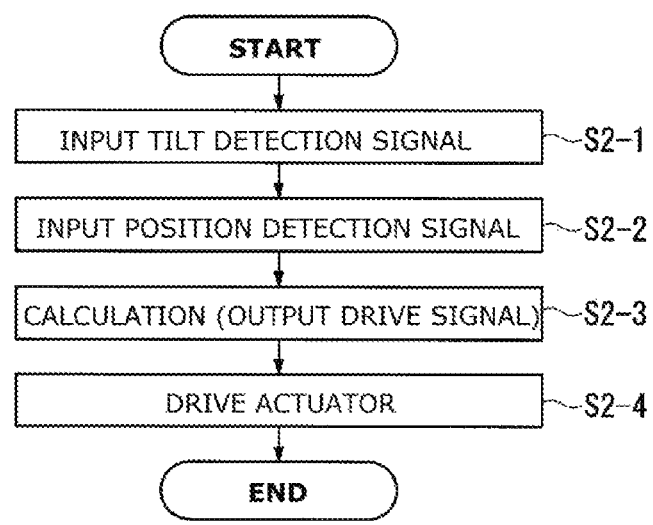
FIG. 10 is a flowchart for explaining the leveling operation by the optical axis adjusting mechanism provided in the vehicular lamp shown in FIG. 1.

Here, the leveling operation by the optical axis adjusting mechanism 13 will be described with reference to FIGS. 7 to 10. FIG. 7 is a block diagram showing a configuration of the controller 50 for controlling the optical axis adjusting mechanism 13. FIG. 8 is a schematic diagram showing a change in the attitude of the vehicle B. FIG. 9 is a schematic view for explaining a leveling operation by the optical axis adjusting mechanism 13. FIG. 10 is a flowchart for explaining the leveling operation by the optical axis adjusting mechanism 13.

As shown in FIG. 7, the vehicular lamp 1 of the present exemplary embodiment includes a controller 50 for automatically adjusting the vertical tilt of the light source unit 4. The controller 50 includes a computer, or an Electronic Control Unit (ECU) 51 for controlling the driving of the actuator 16.

The ECU 51 is electrically connected to the actuator 16. The ECU 51 expands the control program stored in the ROM into the RAM and executes the program, and controls the driving of the actuator 16 in accordance with the result of the operation performed by the ECU.

The ECU 51 is electrically connected to a tilt detecting section 52 for detecting the tilt of the vehicle B in the front-rear direction. As the tilt detecting unit 52, any one may be used as long as the tilt of the vehicle B in the front-rear direction can be detected, and for example, a tilt sensor mounted on the vehicle B, an acceleration (G) sensor, an angular velocity (gyro) sensor, or the like can be used. The tilt detecting section 52 supplies the tilt detecting signal D1 detected by the tilt detecting section 52 to the ECU 51.

The ECU 51 is electrically connected to a position detecting unit 53 for detecting the position of the slide shaft 28 of the actuator 16. As the position detecting unit 53, an encoder or the like provided in the actuator 16 can be used. The position detecting unit 53 supplies the position detection signal D2 detected by the position detecting unit 53 to the ECU 51.

In the present exemplary embodiment, as shown in FIG. 8, a case is exemplified in which the optical axis AX' of the vehicle B is inclined upward by 1° while the vehicle B is traveling (when the vehicle is inclined) with reference to the optical axis AX when the vehicle B is in a stopped state (when the vehicle is horizontal). Therefore, in this case, leveling adjustment for lowering the optical axis AX by −1° is necessary.

In FIG. 9, the low beam light distribution pattern P' before leveling adjustment and the low beam light distribution pattern P after leveling adjustment both projected toward the front of the vehicle B are shown. The intersection of the horizontal axis and the vertical axis shown in FIG. 9 represents the angle reference position (0°) in front of the vehicle B.

In the leveling operation by the optical axis adjusting mechanism 13 of the present exemplary embodiment, first, as shown in step S2-1 in FIG. 10, the tilt detection signal D1 is inputted from the tilt detecting unit 52 to the ECU 51 of the leveling operation.

Next, as shown in step S2-2 in FIG. 10, the position detection signal D2 is inputted from the position detecting unit 53 to the ECU 51.

Next, as shown in step S2-3 in FIG. 10, the ECU 51 performs a calculation on the basis of the tilt detection signal D1 and the position detection signal D2 to calculate the slide amount of the slide shaft 28. Then, a drive signal D3 based on the calculation result is generated and supplied (output) to the actuator 16.

Next, as shown in step S2-4 in FIG. 10, the actuator 16 slides the slide shaft 28 on the basis of the drive signal D3 supplied from the ECU 51. As a result, as shown in FIG. 8, the low beam light distribution pattern P' projected toward the front of the vehicle B is adjusted so that the position in the vertical direction of the optical axis AX becomes the position in which the low beam light distribution pattern P is lowered by −1°.

In the vehicular lamp 1 of the present exemplary embodiment, it is possible to correct the variation of the optical axis due to the attitude change of the vehicle B by such a leveling operation using the optical axis adjusting mechanism 13, i.e., by a leveling operation of automatically adjusting the optical axis of the light projected from the light source unit 4 toward the front of the vehicle B in the vertical direction when the vehicle is traveling (when the vehicle is inclined).

As described above, in the optical axis adjustment mechanism 13 of the present exemplary embodiment, as shown in FIG. 4, the first support point S1, the second support point S2, and the third support point S3 are located outside the light source unit 4 when the light source unit 4 is view in the front view. As a result, the light source unit 4 disposed inside the lamp body 3 can be stably supported. In addition, it is possible to increase the degree of freedom in the arrangement of the first pivot portion 14, the second pivot portion 15, and the actuator 16 located at the support points S1, S2, and S3.

In the optical axis adjustment mechanism 13 of the present exemplary embodiment, it is preferable that, among the three support points S1, S2, and S3 described above, the support line LS assumed to connect the first support point S1 and the second support point S2 is parallel to the first horizontal line LH1 assumed to pass through the light axis center O of the light source unit 4, and that the first vertical line LV1 assumed to pass through the optical axis center O of the light source unit 4 is orthogonal to the support line LS.

In this case, it is possible to swing the holder 6 with respect to the bracket 5 in a stable state in the vertical direction with the first pivot portion 14 and the second pivot portion 15 as fulcrums. Therefore, in the optical axis adjusting mechanism 13 of the present exemplary embodiment, it is possible to stably perform a leveling operation for automatically adjusting the vertical tilt of the light source unit 4.

In the optical axis adjusting mechanism 13 of the present exemplary embodiment, it is preferable that, among the three support points S1, S2, and S3 described above, the support line LS and the third support point S3 are located on the respective sides opposite to each other with the first horizontal line LH1 interposed therebetween, and the optical axis center O of the light source unit 4 is located inside the area E defined by connecting the first support point S1, the second support point S2, and the third support point S3.

Also in this case, it is possible to swing the holder 6 with respect to the bracket 5 in a stable state in the vertical direction with the first pivot portion 14 and the second pivot portion 15 as fulcrums. Therefore, in the optical axis adjusting mechanism 13 of the present exemplary embodiment, it is possible to stably perform a leveling operation for automatically adjusting the vertical tilt of the light source unit 4.

In particular, in the optical axis adjusting mechanism 13 of the present exemplary embodiment, the support line LS (connecting the first support point S1 and the second support point S2) and the third support point S3 are positioned above and below the first horizontal line LH1, respectively, with the first horizontal line LH1 interposed therebetween. Furthermore, the third support point S3 is located on the first vertical line LV1. Further, the optical axis center O of the light source unit 4 is located substantially at the center of the area E. In this case, it is possible to perform the leveling operation by the optical axis adjusting mechanism 13 with high accuracy while suppressing the rattling of the light source unit 4 due to vibration, shock, or the like when the vehicle is traveling.

In the optical axis adjusting mechanism 13 of the present exemplary embodiment, when the light source unit 4 is view in the front view, the fourth support point S4, the fifth support point S5, and the sixth support point S6 are located outside the light source unit 4. As a result, the light source unit 4 disposed inside the lamp body 3 can be stably supported. In addition, it is possible to increase the degree of freedom in the arrangement of the third pivot portion 17, the left-right tilt adjusting tool 18, and the vertical tilt adjusting tool 19 located at the support fulcrums S4, S5, and S6, respectively.

In the optical axis adjustment mechanism 13 of the present exemplary embodiment, it is preferable that, among the three support points S4, S5, and S6 described above, the fifth support point S5 is positioned on the second horizontal line LH2 assumed to pass through the fourth support point S4, and the sixth support point S6 is positioned on the second vertical line LV2 assumed to pass through the fourth support point S4.

In this case, it is possible to swing the bracket 5 with respect to the housing 2 in a stable state in the left-right direction and the vertical direction with the third pivot portion 17 as a fulcrum. Therefore, in the optical axis adjusting mechanism 13 of the present exemplary embodiment, it is possible to stably perform an aiming operation for manually adjusting the tilt of the light source unit 4 in the left-right direction and the vertical direction. In addition, since the tilt adjustment of one of the left and right directions and the vertical direction is not affected by the tilt adjustment of the other, it is possible to easily and accurately perform the aiming operation by the optical axis adjustment mechanism 13.

In particular, in the optical axis adjustment mechanism 13 of the present exemplary embodiment, the fourth support point S4, the fifth support point S5, and the sixth support point S6 are located outside the area E defined by connecting the first support point S1, the second support point S2, and the third support point S3. The fourth support point S4 is located on the support line LS, and the third support point S3 is located in the middle of the second horizontal line LH2. In this case, it is possible to perform the leveling operation by the optical axis adjusting mechanism 13 with high accuracy while suppressing rattling of the light source unit 4 due to vibration, shock, or the like when the vehicle is traveling.

As described above, in the vehicular lamp 1 provided with the optical axis adjustment mechanism 13 of the present exemplary embodiment, the light source unit 4 can be supported in a stable state, and the optical axis adjustment by the optical axis adjustment mechanism 13 can be stably performed.

The present invention is not necessarily limited to the embodiments described above, and various modifications can be made without departing from the spirit of the present invention.

Figure 11:
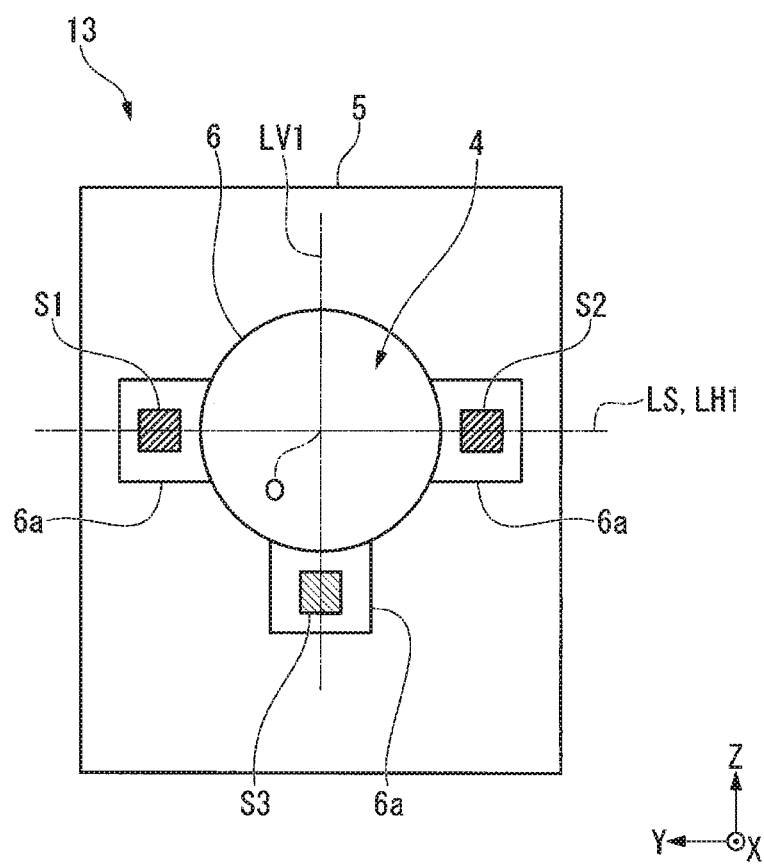
FIG. 11 is a schematic view showing another arrangement example of first, second, and third support points when the light source unit provided in the vehicular lamp shown in FIG. 1 is view in the front view.

For example, in the optical axis adjusting mechanism 13, as shown in FIG. 11, the support line LS and the first horizontal line LH1 may coincide with each other when the light source unit 4 is view in the front view. FIG. 11 is a schematic diagram showing another arrangement example of the first, second, and third support points S1, S2, and S3 when the light source unit 4 is view in the front view.

With this configuration, the holder 6 holding the light source unit 4, i.e., the flange 6a, can be downsized. In addition, it is possible to reduce the swinging range of the holder 6 in the vertical direction with respect to the bracket 5. Further, when an extension (not illustrated) is arranged inside the lamp body 3, the clearance with the light source unit 4 can be reduced, so that the appearance can be improved.

Figure 12:
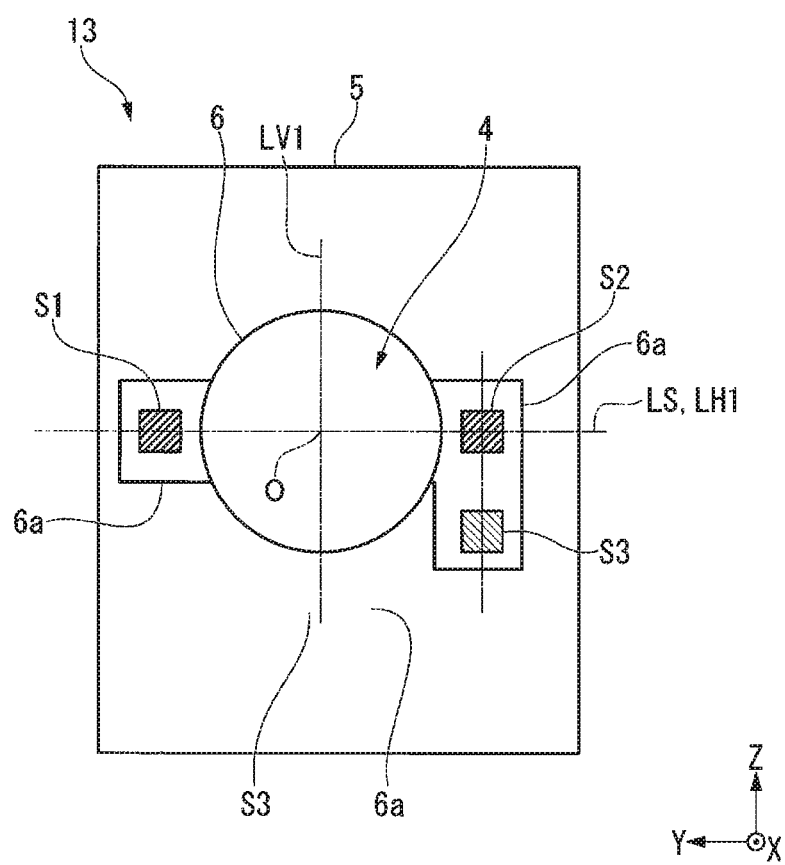
FIG. 12 is a schematic view showing another arrangement example of the first, second, and third support points when the light source unit provided in the vehicular lamp shown in FIG. 1 is view in the front view.

In the optical axis adjustment mechanism 13, as shown in FIG. 12, when the light source unit 4 is viewed in the front view, the third support point S3 may be configured to be positioned on one side relative to the first vertical line LV1. FIG. 12 is a schematic diagram showing another arrangement example of the first, second, and third support points S1, S2, and S3 when the light source unit 4 is viewed in the front view.

In this configuration, although the actuator 16 is arranged asymmetrically with respect to the first vertical lines LV1, the holder 6, i.e., the flanges 6a, for holding the light source unit 4 can be further miniaturized.

Figure 13:
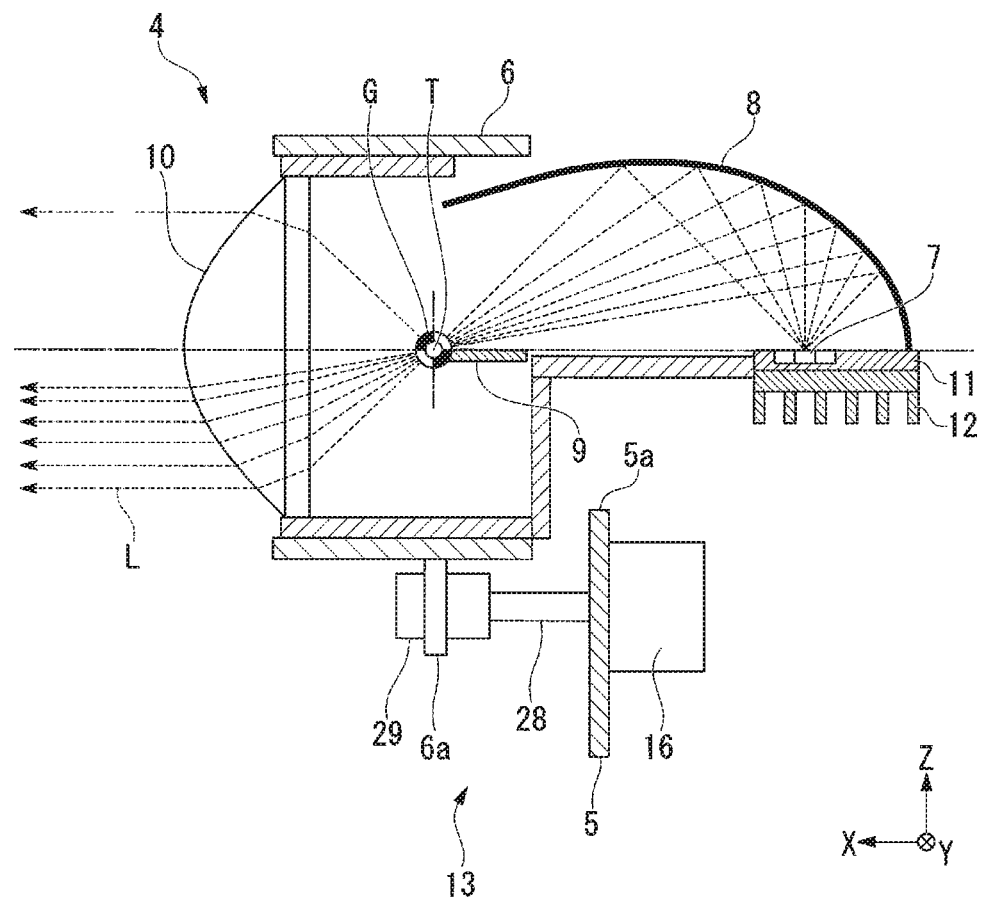
FIG. 13 is a schematic view showing an example of the rotation center and the center of gravity of the light source unit when the light source unit is viewed from the side surface side (in a side view) in the configuration shown in FIGS. 10 and 11.

In addition, in the optical axis adjusting mechanism 13, in addition to the above-described configuration in which the support line LS and the first horizontal line LH1 coincide with each other, as shown in FIG. 13, when the light source unit 4 is viewed in a side view, the rotation center T of the light source unit 4 may be configured to match the center of gravity G of the light source unit 4. FIG. 13 is a schematic diagram showing an example of the rotation center T and the center of gravity G of the light source unit 4 when the light source unit 4 is viewed from the side surface side.

In this configuration, the inertial mass of the light source unit 4 that rotates around the support line LS as the holder 6 swings in the vertical direction with respect to the bracket 5 can be reduced. As a result, the load applied to the actuator 16 can be reduced, so that the actuator 16 can be miniaturized.

Figure 14:
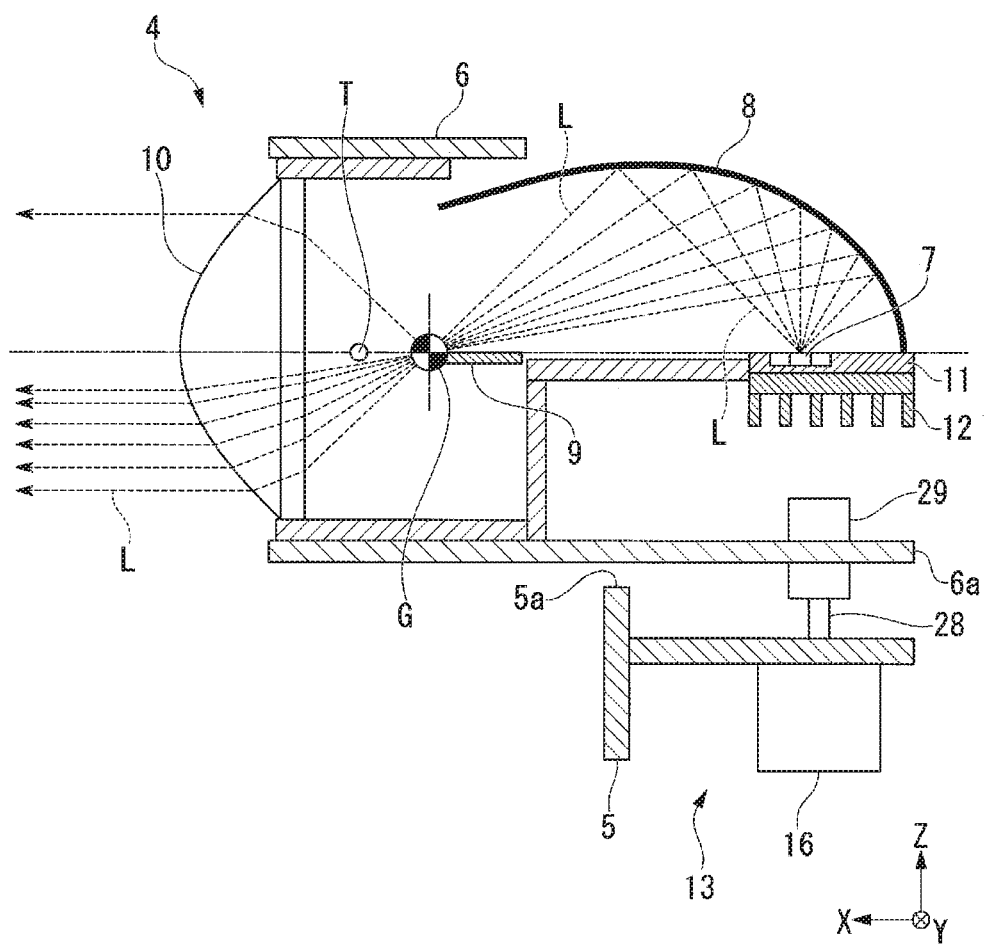
FIG. 14 is a schematic view showing another example of the rotation center and the center of gravity of the light source unit when the light source unit is viewed from the side surface side in the configuration shown in FIGS. 10 and 11.

On the other hand, in the optical axis adjusting device 13, in addition to the above-described configuration in which the support line LS and the first horizontal line LH1 coincide with each other, as shown in FIG. 14, the rotation center T of the light source unit 4 may be positioned forward of the center of gravity G of the light source unit 4 when the light source unit 4 is viewed from the side. FIG. 14 is a schematic diagram showing another example of the rotation center T and the center of gravity G of the light source unit 4 when the light source unit 4 is viewed from the side surface side.

With this configuration, it is possible to reduce the vertical movement of the light source unit 4 which rotates about the support line LS as the holder 6 swings in the vertical direction with respect to the bracket 5. Therefore, when the extension (not illustrated) is arranged inside the lamp body 3, the clearance with the light source unit 4 can be reduced, so that the appearance can be improved.

Further, in the optical axis adjusting mechanism 13, as shown in FIG. 14, it is also possible to change the arrangement of the actuator 16 so as to slidably drive the slide shaft 28 in the vertical direction. Also in this configuration, it is possible to swing the holder 6 in the vertical direction with respect to the bracket 5.

In the configuration shown in FIG. 14, the center of gravity G of the light source unit 4 is located inside the area defined by connecting the first support point S1 and the second support point S2 positioned forward of the center of gravity G of the light source unit 4 and the third support point S3 positioned rearward of the center of gravity G of the light source unit 4, whereby it is possible to further improve the stability of the light source unit 4 against vibration, shock, or the like when the vehicle is traveling.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicular lamp comprising:
   a housing having an opening at a front surface thereof;
   a lens cover configured to cover the opening of the housing to form a lamp body together with the housing;
   a light source unit configured to project light toward a front of a vehicle, the light source unit being disposed inside the lamp body;
   an optical axis adjustment mechanism configured to adjust an optical axis of light projected from the light source unit toward the front of the vehicle; and
   a holder configured to hold the light source unit and to be attached to the front surface of the housing via a bracket, the holder being supported so as to be tiltable with respect to the bracket, wherein
   the optical axis adjusting mechanism includes: three support points configured to support the holder with respect to the bracket; and a first pivot portion located at a first support point among the three support points and supporting the holder so that the holder is tiltable with respect to the bracket; a second pivot portion located at a second support point among the three support points and supporting the holder so that the holder is tiltable with respect to the bracket; and an actuator located at a third support point among the three support points, the actuator being configured to adjust a tilt of the holder with respect to the bracket in a vertical direction, the first support point, the second support point, and the third support point are located outside the light source unit when the light source unit is viewed in a front view, when the light source unit is viewed in the front view, a support line assumed to connect the first support point and the second support point is parallel to a first horizontal line assumed to pass through the light source unit, and a first vertical line assumed to pass through the light source unit is orthogonal to the support line in a middle of the support line, the third support point is located on the first vertical line, and the support line and the third support point are located on respective sides opposite to each other across the first horizontal line, and the actuator is fixed to the bracket, so that the actuator slidably drives an own slide shaft in a front-rear direction and the holder thereby swings in the vertical direction with respect to the bracket with the first pivot portion and the second pivot portion as a fulcrum.

2. The vehicular lamp according to claim 1, wherein the vehicular lamp has a structure in which the bracket is supported by fourth, fifth and sixth support points different from the first, second, and third support points so as to be tiltable with respect to the housing, the vehicular lamp further comprises a third pivot portion located at the fourth support point and supporting the bracket so that the bracket is tiltable with respect to the housing, a left-right tilt adjusting tool located at the fifth support point and being configured to adjust a tilt of the bracket with respect to the housing in the left-right direction, and a support portion located at the sixth support point and being configured to tiltably support the bracket with respect to the housing, the fourth support point, the fifth support point and the sixth support point are located outside the light source unit when the light source unit is viewed in the front view, and when the light source unit is viewed in the front view, a second vertical line assumed to pass through both the fourth support point and the sixth support point is parallel to the first vertical line.

3. The vehicular lamp according to claim 2, wherein, when the light source unit is viewed in the front view, the optical axis center of the light source unit is located inside an area defined by connecting the first support point, the second support point, and the third support point.

4. The vehicular lamp according to claim 1, wherein the light source unit includes an LED light source, and a reflector configured to reflect light emitted from the LED light source.

5. The vehicular lamp according to claim 2, wherein the light source unit includes an LED light source, and a reflector configured to reflect light emitted from the LED light source.

6. The vehicular lamp according to claim 3, wherein the light source unit includes an LED light source, and a reflector configured to reflect light emitted from the LED light source.

7. The vehicular lamp according to claim 4, wherein the light source unit includes a heat sink provided to a side opposite to the reflector and configured to radiate heat emitted by the LED light source.

8. The vehicular lamp according to claim 5, wherein the light source unit includes a heat sink provided to a side opposite to the reflector and configured to radiate heat emitted by the LED light source.

9. The vehicular lamp according to claim 6, wherein the light source unit includes a heat sink provided to a side opposite to the reflector and configured to radiate heat emitted by the LED light source.

10. The vehicular lamp according to claim 3, wherein the optical axis center of light emitted from the light source unit and projected toward the front of the vehicle is located substantially at the center of the area.

* * * * *